April 30, 1957      B. BARÉNYI      2,790,674

BODY STRUCTURE FOR AUTOMOTIVE VEHICLES

Filed May 10, 1951

Inventor
Béla Barényi
By Dicke and Padlon
Attorneys

United States Patent Office 2,790,674
Patented Apr. 30, 1957

2,790,674

BODY STRUCTURE FOR AUTOMOTIVE VEHICLES

Béla Barényi, Stuttgart-Rohr, Germany

Application May 10, 1951, Serial No. 225,615
In Germany January 26, 1949

Public Law 619, August 23, 1954
Patent expires January 26, 1969

1 Claim. (Cl. 296—28)

The present invention relates to body structures for vehicles and particularly to body structures for passenger cars.

It is an object of the present invention to provide a streamlined body structure having minimum resistance to air flow and affording maximum vision to the driver of the vehicle. The body structure is to have a minimum of corners and recesses so as to be easy to be cleaned.

According to the present invention the body structure is mainly composed of two narrow side sections and a wide center section. All three of these body sections, extending substantially over the entire length of the vehicle, are rigidly and permanently fastened to one another, for instance by welding. The two side sections, within which the upper portions of the wheels of the vehicle are entirely or partially enclosed, have substantially semi-elliptic longitudinal sectional area. The transverse sectional area of the side sections can either be similar to an oval with its long axis placed upright or similar to the cross section of an upright torus or can be similar to a semi-oval or to the cross section of a semi-torus placed in an upright position. The center section consists of an upper and lower panel joined to the upper and the lower portion of the two side sections, the upper panel being of symmetrically concave shape intersecting the horizontal center plane of the vehicle at its lowest point. The lower panel has a substantially continuous or constant curvature and is provided with suitable openings for the wheels and other chassis parts.

In a particularly desirable embodiment of the present invention the lower panel of the center section extends outwardly of the two side sections as well as outwardly of the front and rear side of the upper panel of the center section. This protruding lower panel is curved upwardly and then inwardly over its entire circumference, so as to form a substantially wing-like structure protruding from the lower part of the body structure. The horizontal center plane of this protruding lower structure is located substantially the same distance above the road level as the axes of the wheels. The horizontal as well as the transverse sectional area of the entire protruding structure closely resembles an air foil. This protruding structure protects the main body panels in case of collision and at the same time contributes to lower the resistance of the vehicle to air flow. It also aids in increasing the rigidity of the body structure and in improving its appearance.

A body construction according to the present invention is illustrated in the accompanying drawings of which:

Figure 3:
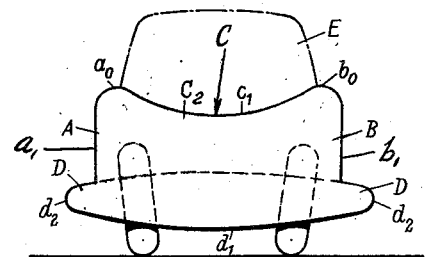
Fig. 3 is a transverse sectional view taken on line III—III of Fig. 1.
Figure 1:
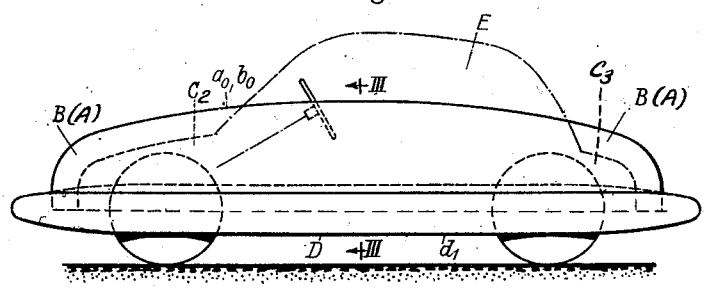
Fig. 1 is a longitudinal view of a vehicle.
Figure 2:
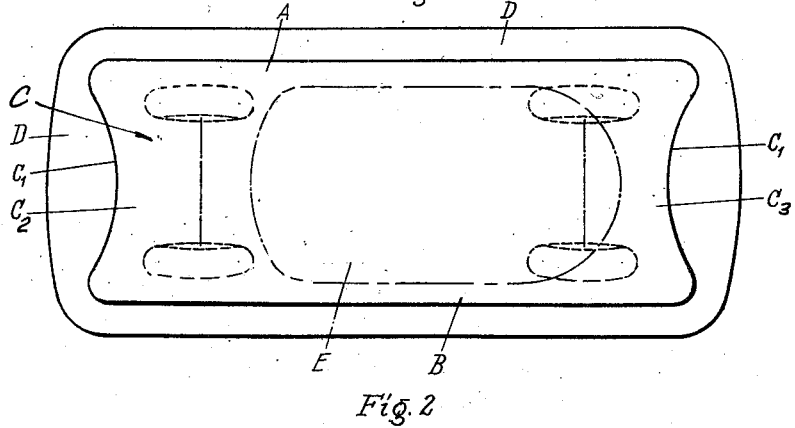
Fig. 2 is a top plan view of the vehicle shown in Fig. 1.

The body structure is composed of two narrow side sections A and B formed as inverted trough-like shapes with adjoining vertical outside panels $a_1$ and $b_1$ and of a center section generally designated by reference character C. The lower panel $d_1$ of the center section extends outwardly and is curved over its entire circumference so as to form the lower wing-like structure D. The transverse cross sectional area of the inverted trough-like side sections A and B may be of substantially semi-oval shape and their longitudinal sectional area of substantially semi-elliptic shape. The upper panel $C_1$ of the center section C which may consist of a front portion $C_2$ and a rear portion $C_3$ separated from each other by the passenger space, is of concave shape so as to improve the vision of the driver towards the road ahead of him. The outermost contour of the structure D is designated with the reference numeral $d_2$ and has the same distance from the road as the axes of the wheels. In case the basic body structure is used on a closed passenger car an additional upper body section E may be provided, which may intersect the side sections as indicated by the line $a_0$, $b_0$, and which joins the front portion $C_2$ of the upper panel with rear portion $C_3$ thereof. It is understood, however, that in practice the various body sections, which represent the components of the basic body structure and which are only illustrated schematically in the drawing, may be provided with appropriate spaces, recesses or indentations in connection with the passenger compartment.

What I claim is:

In an automotive vehicle, a streamlined body structure having a pair of front wheels and a pair of rear wheels, comprising a pair of narrow-side body sections consisting of two inverted trough-like shapes with adjoining essentially vertical outside panels and a wide center body section between said two side sections, said three body sections extending substantially over the entire length of the vehicle and being rigidly fastened to one another, the center section extending substantially intermediate the wheel tread and to the front and rear of said vehicle, said two side sections having a substantially semi-elliptic longitudinal sectional area and being provided with bottom openings to receive and cover the upper portion of the wheels, said center section consisting of two upper panels, an upper body section enclosing the passenger compartment intermediate said two panels and intersecting said side sections, and a lower panel joined to the lower portions of said two side sections, said two narrow side body sections being provided with inner recesses in the regions thereof adjacent said passenger compartment, said upper panels being of symmetrically concave shape to increase the visibility from the interior to the exterior of the vehicle, said lower panel covering the bottom side of the space between said two side sections and having a substantially continuous curvature, said lower panel also extending outwardly beyond said two side sections as well as outwardly beyond the front and rear end of said upper panels, the protruding part of said lower panel being curved upwardly and inwardly over its entire circumference so as to form a substantially wing-like structure surrounding the lower part of the body structure and having a horizontal center plane located substantially the same distance above the road as the axes of the wheels.

References Cited in the file of this patent

UNITED STATES PATENTS

| | | |
|---|---|---|
| D. 90,577 | Geddes | Aug. 29, 1933 |
| D. 137,812 | Myers | May 2, 1944 |
| D. 142,455 | Wells et al. | Sept. 25, 1945 |
| D. 167,905 | Muller | Oct. 7, 1952 |
| 2,126,943 | Best | Aug. 16, 1938 |
| 2,206,202 | Reid | July 2, 1940 |
| 2,254,497 | Schafer | Sept. 2, 1941 |
| 2,551,054 | Sanmori | May 1, 1951 |
| 2,634,816 | Martin | Apr. 14, 1953 |

(Other references on following page)

FOREIGN PATENTS

| | | |
|---|---|---|
| 881,579 | France | Jan. 28, 1943 |
| 976,255 | France | Oct. 25, 1950 |
| 710,241 | Germany | Sept. 8, 1941 |
| 502,334 | Great Britain | Mar. 15, 1939 |
| 505,524 | Great Britain | May 12, 1939 |

OTHER REFERENCES

"The Austrian Porsche, a Glamorized Volkswagen," in "Automotive Industries," Oct. 1, 1948, pp. 44 and 60.

"Designing a Minicar," in "Autocar" Magazine, Dec. 10, 1948; pp. 1212–1215.

Labourdette Illustration, in "The Paris Salon" in "Automobile Engineer" Magazine of December 1950, p. 433.